(No Model.)

R. FOSTER & J. HOWARD.
METALLIC WHEEL.

No. 413,933. Patented Oct. 29, 1889.

WITNESSES.
Frank Mills
W J Bainbridge

INVENTORS
Ross Foster
Jacob Howard
By Watson + Thurston
Their Attorneys

United States Patent Office.

ROSS FOSTER AND JACOB HOWARD, OF CLEVELAND, OHIO, ASSIGNORS TO THE AVERY STAMPING COMPANY, OF SAME PLACE.

METALLIC WHEEL.

SPECIFICATION forming part of Letters Patent No. 413,933, dated October 29, 1889.

Application filed February 29, 1888. Renewed April 22, 1889. Serial No. 308,235. (No model.)

*To all whom it may concern:*

Be it known that we, ROSS FOSTER, a citizen of the United States, and JACOB HOWARD, a subject of the Queen of Great Britain, both residing in the city of Cleveland, in the county of Cuyahoga and State of Ohio, have invented certain new and useful Improvements in Metallic Wheels, of which the following is a full, clear, and exact description, reference being had to the accompanying drawings, in which—

Figure 1:
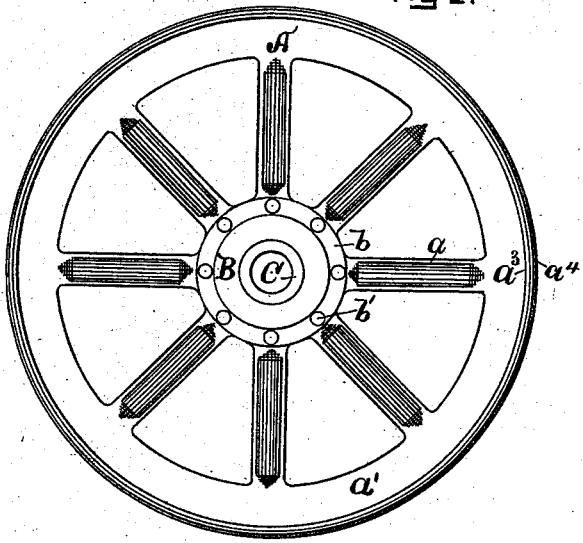
Figure 2:
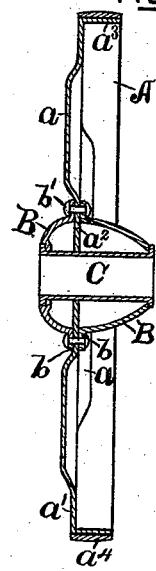
Figure 5:
Figure 3:
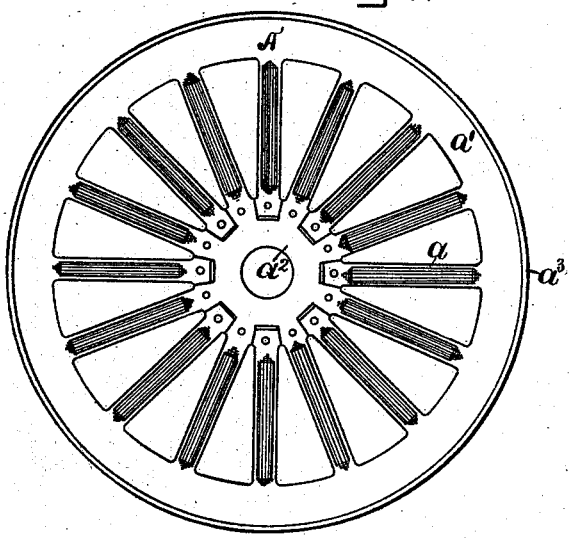
Figure 4:
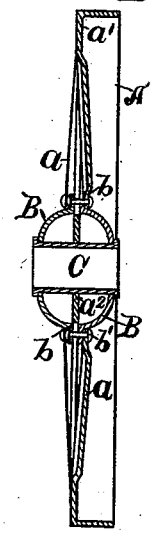

Figure 1 is a side elevation of our wheel in its preferable form. Fig. 2 is a central vertical sectional view thereof. Fig. 3 is a side elevation of the blank employed in making a modified form of the wheel. Fig. 4 is a central vertical sectional view of a wheel of said modified form. Fig. 5 is a transverse section of one of the spokes of the wheel.

Like letters represent similar parts in the several figures.

Our invention relates to metallic wheels best adapted for use upon cheap structures where beauty of design or artistic finish are not necessary; and the object is to cheapen, so far as possible, such wheels without affecting their strength or durability.

To this end it consists in the construction and combination of parts herein fully and clearly described, and pointed out definitely in the claims.

Referring to the parts by letter, A represents a blank struck out by suitable dies from a sheet of metal of suitable thickness, which blank consists of the following integral parts, to wit: spokes $a$ $a$, the rim $a'$, the hub $a^2$, and annular flange $a^3$, which is turned over from the rim $a'$. The spokes are then bent longitudinally, as shown in Fig. 5, and in the best form the alternate spokes are bent in opposite directions, so as to present alternately convex and concave surfaces on either face of the wheel. The bending of the spokes very materially increases the strength of each, and the bending of the alternate spokes in opposite directions increases the strength of the wheel by resisting the liability of two consecutive spokes to bend in the same direction, and consequently to permit the collapse of the rim. Upon the outer edge of the wheel a tire $a^4$ may be secured to the flange $a^3$ either by shrinking it on or by riveting it to said flange.

B B represent two hub-pieces, preferably cup-shaped, as shown, each provided with the annular flanges $b$ and a central orifice. These pieces are placed upon opposite sides of the wheel-blank and secured thereto by rivets $b'$, which pass through both flanges $b$ $b$ and the hub part $a^2$ of said blank, thereby forming the hub of the wheel.

C represents the box formed from a pipe of suitable length, which is passed through the central orifice of the hub and there secured by having the ends of the pipe upset, the orifice in the pieces B B being preferably countersunk to receive the upset ends of said pipe and leave smooth surfaces on the outside of the hub.

The above-described wheel may be modified and strengthened somewhat, as shown in Figs. 3 and 4. Fig. 3 shows a blank in which the number of spokes is increased and every other spoke is cut free at its inner end and made longer than its neighbors by cutting out some of the hub part $a^2$, as shown. Two series of spokes are thereby obtained, and each spoke is bent longitudinally in the manner and for the purpose specified, and preferably the alternate spokes of each series are bent in opposite directions. The alternate long spokes are then bent at or near the rim in opposite directions, as shown, and the hub-pieces B B arranged, as before explained, on each side of the blank A, the free ends of the long spokes being on the outside of said pieces B B. The parts are then secured together by rivets, which pass through the free end of each long spoke and the flanges $b$ $b$.

We claim as our invention—

1. A sheet-metal-wheel blank stamped from a single piece of metal, consisting of the following integral parts, to wit: a hub $a^2$, spokes $a$ $a$, rim $a'$, and turned-over annular flange $a^3$, said spokes being bent longitudinally, every alternate spoke in one direction and the intermediate spokes in the opposite direction, substantially as and for the purpose specified.

2. A sheet-metal wheel consisting of a hub $a^2$, spokes $a$ $a$, rim $a'$, and turned-over annular flange $a^3$, all stamped from a single piece of sheet metal, combined with sheet-metal hub-pieces riveted thereto, substantially as and for the purpose specified.

3. A sheet-metal-wheel blank and the hub-pieces B B, secured thereto, combined with a pipe C, passed through said blank and hub-pieces and secured in place by having its ends upset, substantially as and for the purpose specified.

ROSS FOSTER.
JACOB HOWARD.

Witnesses:
  E. L. THURSTON,
  A. A. CARLISLE.